United States Patent
Peterson et al.

(10) Patent No.: US 9,244,741 B2
(45) Date of Patent: Jan. 26, 2016

(54) SYSTEM AND METHOD FOR SERVICE MOBILITY

(75) Inventors: Robert W. Peterson, Plano, TX (US); Thomas T. Wheeler, Frisco, TX (US)

(73) Assignee: Open Invention Network, LLC, Durham, NC (US)

( * ) Notice: Subject to any disclaimer, the term of this patent is extended or adjusted under 35 U.S.C. 154(b) by 543 days.

(21) Appl. No.: 13/078,948

(22) Filed: Apr. 2, 2011

(65) Prior Publication Data

US 2012/0254279 A1 Oct. 4, 2012

(51) Int. Cl.
*G06F 15/16* (2006.01)
*G06F 9/50* (2006.01)
*H04L 29/08* (2006.01)

(52) U.S. Cl.
CPC .......... *G06F 9/5055* (2013.01); *H04L 67/2814* (2013.01); *H04L 67/16* (2013.01)

(58) Field of Classification Search
CPC . H04L 41/0233; H04L 69/40; H04L 67/1095; H04L 67/148; H04L 67/2814
USPC ........................................................ 709/201
See application file for complete search history.

(56) References Cited

U.S. PATENT DOCUMENTS

| | | | |
|---|---|---|---|
| 6,018,805 A * | 1/2000 | Ma et al. ........................ | 714/4.3 |
| 6,026,428 A * | 2/2000 | Hutchison et al. ............ | 718/108 |
| 6,225,995 B1 * | 5/2001 | Jacobs et al. .................. | 715/738 |
| 6,802,062 B1 * | 10/2004 | Oyamada et al. ................ | 718/1 |
| 6,947,965 B2 * | 9/2005 | Glass ............................ | 709/203 |
| 7,133,891 B1 * | 11/2006 | Uceda-Sosa et al. ......... | 709/203 |
| 7,370,102 B1 * | 5/2008 | Chu et al. ...................... | 709/223 |
| 7,428,723 B2 * | 9/2008 | Greene et al. ................. | 717/103 |
| 7,793,301 B2 * | 9/2010 | Bhat et al. ..................... | 719/313 |
| 8,131,860 B1 * | 3/2012 | Wong et al. ................... | 709/228 |
| 2002/0156943 A1 * | 10/2002 | Ishimura et al. ................. | 710/5 |
| 2004/0078420 A1 * | 4/2004 | Marrow et al. ............... | 709/201 |
| 2005/0038848 A1 * | 2/2005 | Kaluskar et al. .............. | 709/201 |
| 2005/0076165 A1 * | 4/2005 | Fujita et al. ..................... | 710/33 |
| 2005/0172054 A1 * | 8/2005 | Mathrubutham et al. ....... | 710/52 |
| 2007/0078978 A1 * | 4/2007 | Arnold et al. ................. | 709/224 |
| 2007/0271385 A1 * | 11/2007 | Davis et al. ................... | 709/228 |
| 2007/0294660 A1 * | 12/2007 | Chong et al. .................. | 717/103 |

* cited by examiner

*Primary Examiner* — Ario Etienne
*Assistant Examiner* — Blake Rubin
(74) *Attorney, Agent, or Firm* — Haynes and Boone, LLP (57) ABSTRACT

When service requirements require moving of services registered with an object request broker (ORB) at a source server, continuity of service to service requests from clients may be provided by queuing the service requests at the source server. A server context with the same GUID as a source server context may be established at a destination server. URLs for the moved services may be registered with a destination ORB which may then begin receiving service requests. The source server may then respond to the queued service requests with respective URLs for the services registered at the destination ORB. Endpoints at the clients may be updated with the new URLs prior to resending the service requests. The movement of the ORB to the destination server may thus be transparent to the client application.

18 Claims, 6 Drawing Sheets

SYSTEM AND METHOD FOR SERVICE MOBILITY

FIELD OF THE INVENTION

This disclosure relates to distributed computing applications and in particular to systems and methods for servicing clients during mobility and/or unavailability of a server.

BACKGROUND OF THE INVENTION

With the advent of mobile computing devices, distributed computing applications are growing in number and complexity. The present Applicants and/or Assignees have developed a suite of innovations relating to mobile applications. These applications operate under the name of Voyager™. The Voyager suite provides mobile agent applications that can communicate with agents on other devices. Agents can communicate with each other using a client/server model. A server application on one device can establish a server context that provides server functions to client applications on other devices. The server context operates an object request broker (ORB), as is known. The ORB provides a brokering service to handle client requests for a distributed object or component. Having ORB support in a network means that a client program can request a service without having to understand where the server is in a distributed network or exactly how the interface to the server program is realized. Components can find out about each other and exchange interface information as they are running.

In a mobile applications or distributed computing environment, it can at times be necessary or desirable to move an Object Request Broker (ORB) and associated services from one host location to another. Reasons for the move might include the original computer requiring a shutdown for maintenance reasons, because of loss of power (and UPS depletion), or for load balancing reasons. The challenging requirement is to execute the move with zero downtime for the services registered in the ORB.

Existing solutions include moving an entire virtual machine in which the ORB is running or shutting down the application containing the ORB and restarting the application on the destination machine. A problem with these solutions is that they sometimes fail to satisfy the continuous operation requirement (they shut down ORB operation for the duration of the move), or lack the granularity of moving a single ORB (e.g., moving an entire virtual machine).

What is required is an improved system and method for providing continuous service of a server application.

SUMMARY OF THE INVENTION

In one aspect of the disclosure, there is provided a method for moving an object request broker comprising at least one registered service from a source server to a destination server. In the method, the source server suspends processing for new service requests. Instead of being processed, the service requests are queued while a destination object request broker is established in a destination server. The source server communicates at least one service from the source server to the destination object request broker that registers the service in the destination object request broker. The source server responds to the queued service requests from the source server to the one or more clients with an identity of the destination object request broker.

In one aspect of the disclosure, there is provided a method for requesting services from a client application to a source server. The method comprises sending a service request to the source server using a URL stored in an endpoint at the client and caching the service request in the client. A response to the service request may include an indication of destination server, in which case the client retrieves the cached service request and resends the cached service request to the destination server.

In one aspect of the disclosure, there is provided a system comprising a source server and a destination server. The source server comprises a source server application executing on the source server that is configured to generate a source server context comprising a server context identity and a source object request broker which registers one or more services. The source server application may communicate a move command to the destination server that indicates the server context identity and the one or more services. The destination server may comprise a destination server application executing on the destination server. The destination server application may be configured to receive the move command from the source server application and in response, establish a destination server context comprising the server context identity and a destination object request broker that registers the one or more services indicated in the move command.

BRIEF DESCRIPTION OF THE DRAWINGS

Reference will now be made, by way of example only, to specific embodiments and to the accompanying drawings in which.

DETAILED DESCRIPTION OF THE INVENTION

Figure 6:
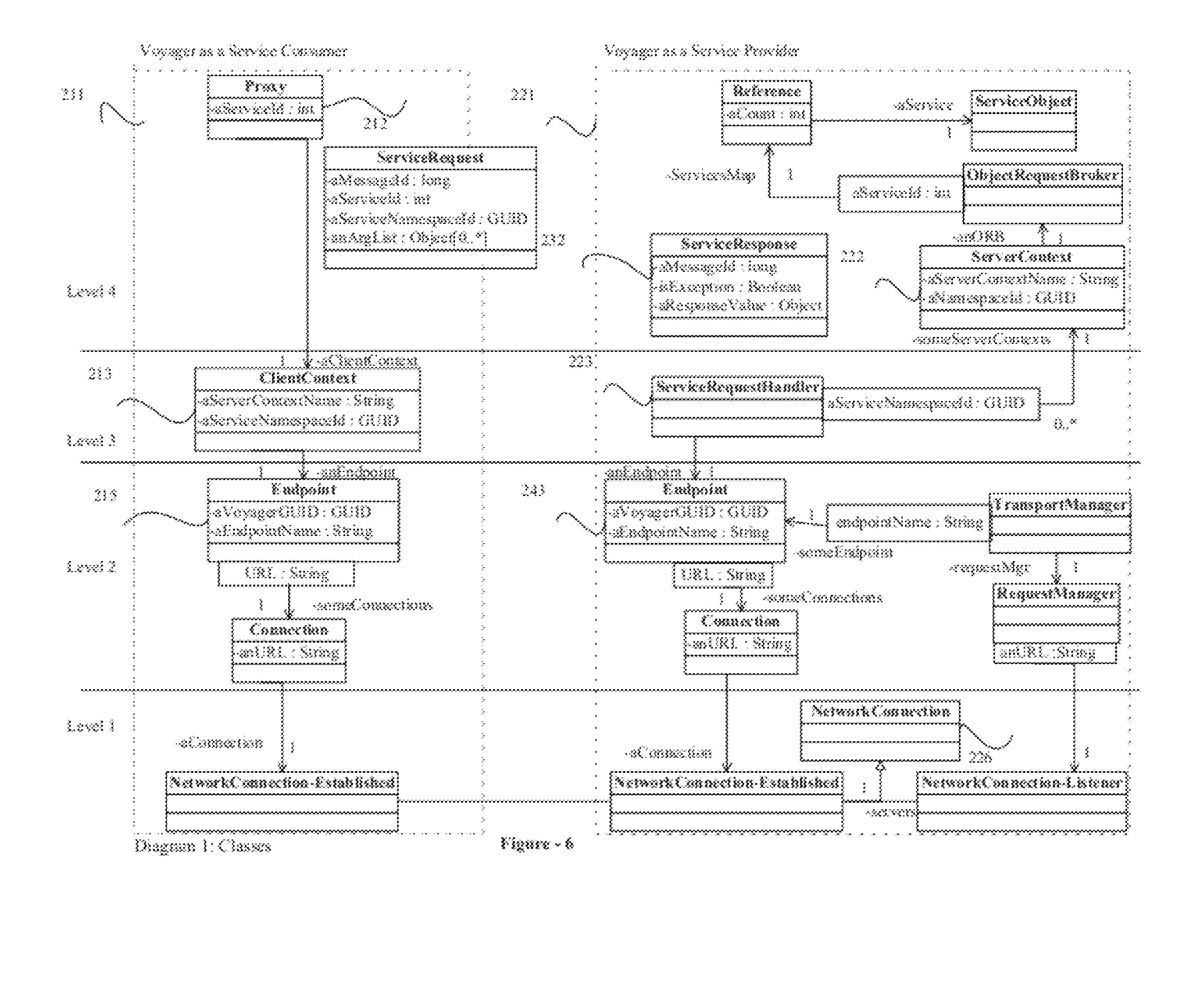
FIG. 6 shows a distributed object computing platform with a client instance and a server instance.

The description and understanding of the present embodiments will be facilitated by a brief summary of the Voyager platform, made with reference to the system 200 shown in FIG. 6, some aspects of which may relate to similar distributed object computing systems. Further details of the platform are described in the Applicant's co-pending patent application Ser. No. 13/078,940, filed Apr. 2, 2011, entitled SYSTEM AND METHOD FOR CONNECTION EFFICIENCY, the entire contents of which are incorporated herein by reference. A person skilled in the art will readily understand that not all aspects of the Voyager platform are necessary for performing the present embodiments.

In FIG. 6, there is shown an instance 221 of a distributed object application operating as a service provider on a server device. The server device may be a computing system comprising at least one processor and at least one operatively associated memory. The memory may store executable instructions for executing the server application. FIG. 6 also shows an instance 211 of a distributed object application operating as a service consumer or client on a client device. The client device may be a computing system comprising at least one processor and at least one operatively associated memory. The memory may store executable instructions for executing the client application. While only a single server instance 221 and a single client instance 211 is shown, the network may include multiple servers and multiple clients.

A network connection may be defined as a Level 1 connection. Level 1 connections are typically created and managed using services provided by an operating system and/or programming language. A TCP connection over an Ethernet LAN is an example of a Level 1 connection.

An "Endpoint" may be defined as a Level 2 connection. An Endpoint is one end of a Level 1 connection between two independent copies of Voyager. An Endpoint can be created by a server that accepts connection requests or by a client when a connection is required. An Endpoint typically manages one end of a network connection, e.g., a TCP socket. An Endpoint's identity is the identity of the application instance (Voyager instance) containing it. An Endpoint also contains zero or more network addresses, used to identify the Level 1 network connections it contains or could contain, and zero or more Level connections, each identified by a network address. FIG. 6 shows a client side endpoint 215 and a server side endpoint 243.

When two Endpoints connect using a Level 1 connection they exchange a handshake packet that contains at least the identity of each Endpoint.

The connection between a service consumer and a collection of services offered by a service provider may be defined as a Level 3 connection.

A ServiceRequestHandler 223 may be defined as the Endpoint container at the service provider end of a Level 3 connection. A ServiceRequestHandler 223 routes a ServiceRequest to a ServerContext 222.

A ClientContext 213 may be defined as the service consumer at one end of a Level 3 connection. A ClientContext 213 typically references one Endpoint 215. A ClientContext's identity is the same as the identity of the ServerContext 222 at the other end of the logical connection.

Establishing a Level 3 connection involves associating a ClientContext 213 and a ServerContext 222 with a Level 2 connection. To establish the ClientContext end, an application provides the ClientContext 213 with an appropriate Endpoint 215. The ClientContext 213 then sends a request for a Level 3 connection over the Level 1 connection managed by the provided Endpoint 215. The request includes at least the identity of the ServerContext whose services the ClientContext requires. The Voyager that receives the request for a Level 3 connection identifies the ServerContext and asks the ServerContext to establish the Level 3 connection.

The connection between a single identified service provider and a single service consumer may be defined as a Level connection. In Voyager terms, a service provider is an exported object, and a service consumer is the API of a service provider realized by the service provider's proxy.

A ServerContext 222 may be defined as the service provider manager at the service end of a Level 4 connection. A ServerContext 222 has a unique identity and is not directly associated with an Endpoint 243.

The lifetime of a Level 1 connection, which is managed by the containing Endpoint, may be the same as or shorter than the lifetime of an Endpoint.

The lifetime of an Endpoint, a Level 2 connection, is managed by the application.

The lifetime of a Level 3 connection, i.e., a ClientContext or a ServerContext, is managed by the application.

A Level 1 connection may be shared by zero or more Level 2 connections.

A Level 2 connection may be shared by zero or more Level 3 connections.

A Level 3 connection may be shared by zero or more Level 4 connections.

A ClientContext references exactly one ServiceRequestHandler. A ServiceRequestHandler references all the ServerContexts in the containing server instance.

A ServerContext may be referenced by zero or more ServiceRequestHandlers.

FIG. 6 also shows the relationships among the items. In FIG. 6, an open diamond arrowhead, e.g. NetworkConnection 226, shows inheritance (i.e. an "is a" relationship) while an open arrowhead, e.g. on the line between Proxy 212 and ClientContext 213, shows a reference. A box at one end of a reference indicates that the line represents a collection with the item in the box as the key used to find a specific instance within the collection.

As outlined above, services may be invoked on client applications through a proxy 212 that retrieves a service from a service provider 221. The service may be invoked via a service request 231 from the proxy to a ServerContext 222 that stores the service and provides a service request response 232.

With the foregoing described as a basis of a distributed object computing system, the present embodiments will now be described with reference to the Figures.

Figure 1:
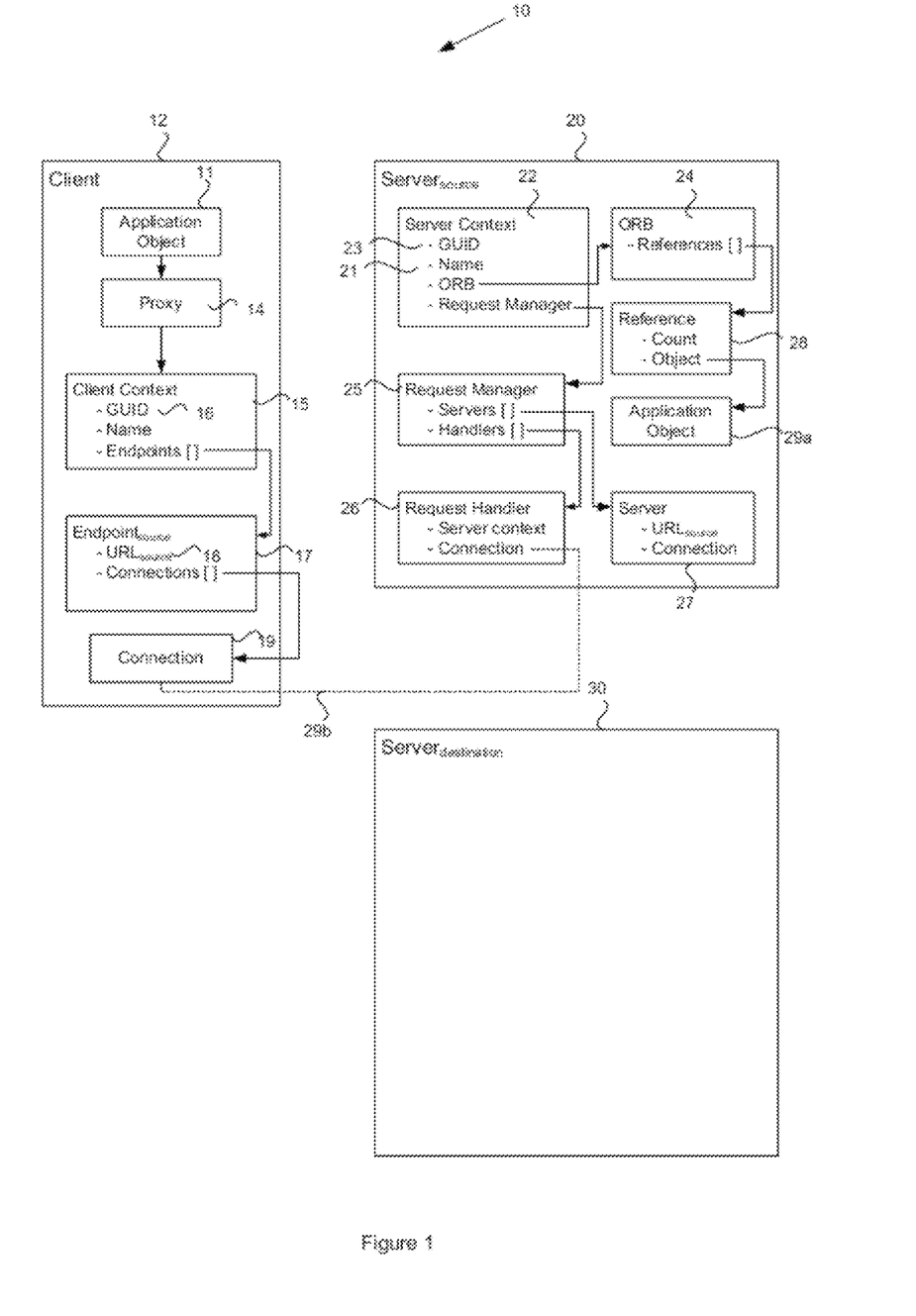
FIG. 1 shows a client, server source and server destination at an initial state.
Figure 2:
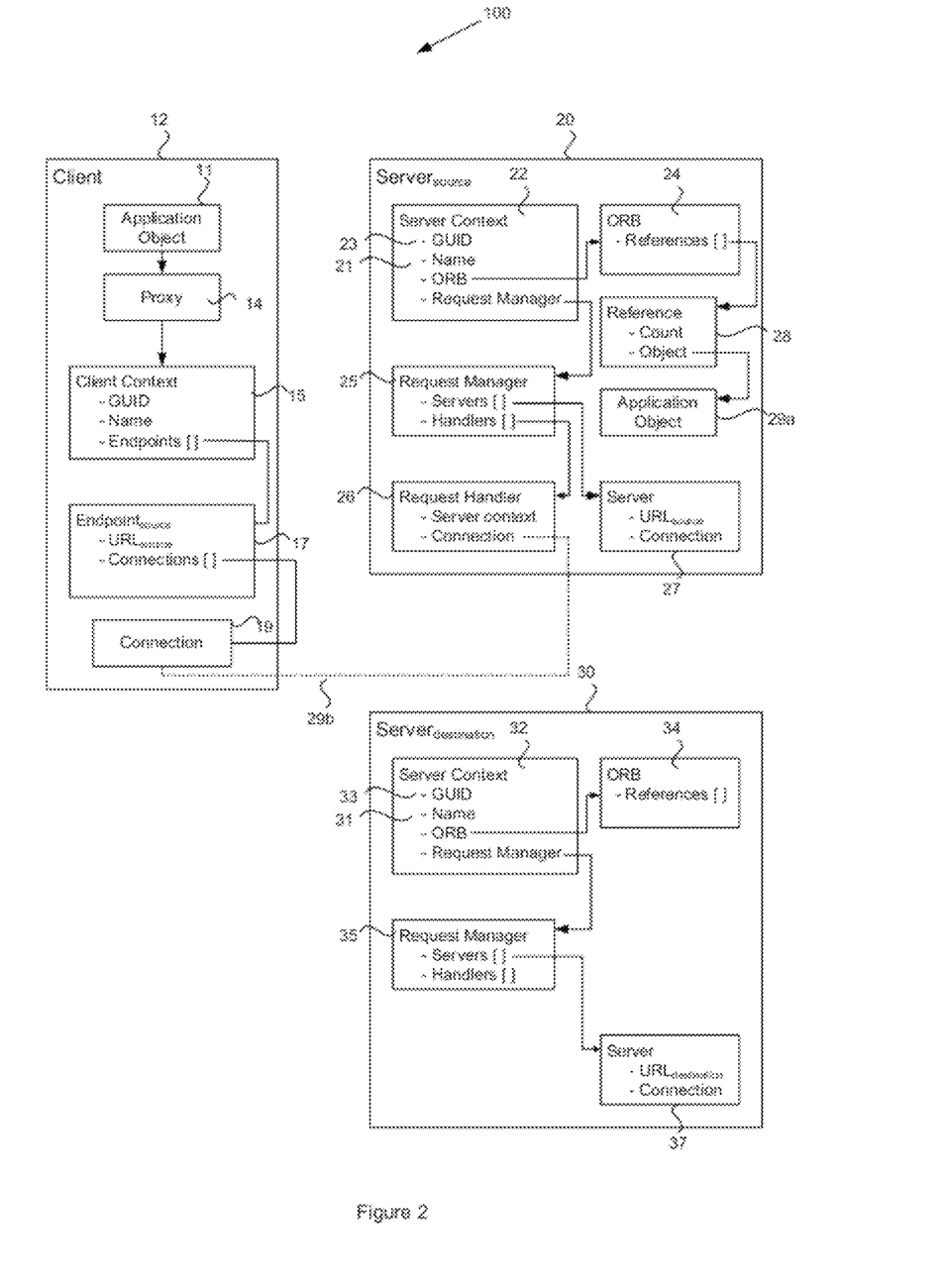
FIG. 2 shows the client, server source and server destination at a first intermediate state.

In FIG. 1, there is shown a system 10 on which the methods to be described may be embodied. In the depiction shown, there are three copies of an application running. One of these applications is operating as a client 12, one as a Server Source 20, and the third as a Server Destination 30. Server Source 20 contains at least one service registered with the service broker, that means any Client is able to create a reference, realized as a proxy, to the service. Client 12 has a proxy 14 that references the service found in the service broker 24 of Server Source 20. The Client proxy 14 references the Server Source service indirectly, as explained below.

In one embodiment, the Servers and Clients may be provided on the present Applicant's Voyager platform. However, this example is not intended to be limiting and a person skilled in the art will understand that other examples are possible without departing from the scope of what is being described and that all such examples are intended to be encompassed herein.

While an application typically asks Voyager to create a ServerContext when the application initializes, a ServerContext can be created at any time during the lifetime of Voyager. A single instance of Voyager can contain zero or more Server Contexts.

An application's request to create a Server Context includes a unique name, and zero or more Universal Resource Locators (URLs). A Server Context 22 is shown within the Server Source 20 in FIG. 1. At creation a ServerContext 22 creates a globally unique identifier (GUID) 23 that uniquely identifies that ServerContext 22 throughout its lifetime, an empty Object Request Broker (ORB) 24 that holds references to all services 28 that can be referenced via the ServerContext, and a RequestManager 25 that manages the zero or more network services listening for connections. An Application Object 29a is provided as a required parameter when creating a Reference. A Reference and an Application Object are in a one-to-one relationship. Once a ServerContext is created, an application can provide the ServerContext zero or more additional URLs. When a ServerContext receives a URL it immediately creates the underlying network structures, adds the connection 27 to the RequestManager 25, and begins processing connection requests.

The Client proxy 14 points to a local ClientContext that represents Server Source 20 on Client 12. A ClientContext 15 holds the ClientContext's unique name, being the same name as the ServerContext, the globally unique id (GUID) 16 of the ServerContext 22 (i.e. GUID 23) that the ClientContext references, a collection of zero or more Universal Resource Locators (URLs) that reference a Server belonging to ServerSource 20, and a collection of zero or more endpoints. A ClientContext 15 is typically created with only the ServerContext's unique name 21. A ClientContext typically discovers the ServerContext's GUID 23 during the handshake that happens when the ClientContext 15 establishes the initial communication channel to a ServerContext 22. A Client connection 29b to a ServerContext 22 is created on demand, and can be disconnected at any time. The connection between Client 12 and ServerSource 20 could use a TCP socket, an encrypted TCP socket, a connection over Bluetooth, a connection between two RS-232 serial ports, or any other communication mechanism able to move data between two endpoints.

In the context of the Voyager platform, the Client (i.e. Voyager Client) depicted in FIG. 1 is running applications that created and currently use proxies to services made available, "exported" by ServerSource 20 (i.e. Voyager Server Source). This means the following sequence happened in order to establish a connection over which to transfer requests and responses.

1. The server application created a ServerContext, passing in the name and a URL.
   a. The new ServerContext 22 created and saved a new GUID 23.
   b. The new ServerContext 22 created a new request broker (ORB) 24.
   c. The new ServerContext 22 created a new RequestHandler 26.
   d. The new ServerContext 22 asked the new RequestHandler to create a server connection 27 for the URL the application provided.
   e. The RequestHandler established the server connection 27.
   f. The application created a service and asked the ServerContext 22 to export it, thus making the service available to applications on client devices.
   g. The ServerContext associated a reference number 28 with the service, and saved the service in the ORB 24.
2. The application 11 created a ClientContext 15 in a client device, passing in the context name. The ClientContext 15 saved the name.
3. The application Client 12 asked the ClientContext 15 to create a connection and provided the URL.
4. On demand, e.g., when the Application Object 11 used the proxy 14, the ClientContext 15 used the URL to create an Endpoint 17.
5. The Endpoint 17 used the URL 18 to create a connection to ServerSource 20.
6. To establish a connection:
   a. ServerSource 20 detected the connection request in a Server 27, e.g., accepted the connection on a TCP server socket.
   b. The ServerSource 20 created a connection 29b, providing the new Connection 19 a reference to the RequestHandler 26.
   c. Client 12 sends the client handshake over the connection 29b.
   d. ServerSource 20 replies with the server handshake, which includes the ServerContext's GUID 23.
   e. During processing of the server handshake, Client 12 stores the ServerContext's GUID 23 in the ClientContext 15 (GUID indicated as reference numeral 16 in ClientContext 15).
7. The request from the Client Application Object 11 through the proxy 14 is passed over the connection 29b to the RequestHandler 26, which uses the ServerContext's ORB 24 to resolve the addressed service, at which point the RequestHandler executes the Client application's request and returns the result.

As stated above, there can be times when it is necessary or desirable to move an ORB and associated services from one server to another. In an embodiment to be described, the Server Source 20 is able to temporarily suspend processing of requests, and then when the new location becomes available, notify the originator of the request of the new location. The request originator is then able to resubmit the request to the new location without intervention by the client application, i.e., the resubmission happens entirely within the request processing system.

An embodiment of the moving process for moving the ServerContext from ServerSource 20 to ServerDestination 30 will now be described with reference to FIGS. 1 to 4 and to the flowchart 100 of FIG. 5.

Initially Client 12 is connected to the ORB 24 hosted by ServerSource 20 by connection 29b, as depicted in FIG. 1. The ClientContext 15 and ServerContext 22 contain GUID and Name with identical values. The Endpoint 17 and Server 27 contain the same URL, i.e. $URL_{source}$. The application version running on the destination device, e.g. ServerDestination 30, has no ClientContexts or ServerContexts.

At step 101, the ServerSource 20 is asked (e.g. by an administrator who uses an admin API, not shown) to move ServerContext 22 from ServerSource 20 to ServerDestination 30. The move request includes the URLs that ServerDestination 30 will use to create Connections and RequestHandlers 36 on ServerDestination 30 that match those in ServerSource 20.

At step 102, ServerSource 20 asks ServerDestination to create a new ServerContext on ServerDestination 30 with the same name and GUID as the ServerSource ServerContext that is moving. While this means that temporarily, the GUID is not actually globally unique, at this stage in the process, the process requests are still being handled by ServerSource 20 so no conflict exists. ServerSource 20 includes in the request the server URLs 27.

ServerDestination 30, as part of starting up, creates a ServerContext and the rest of the related objects. A single collection of distinguished objects with special index numbers exists in all ORBs, e.g., Namespace, Factory, and other objects providing Voyager services as distinguished from application services. The lifetime of these distinguished services is the same as the lifetime of a Voyager instance. The ORB move service may be provided as one of these distinguished services and used by the ServerSource and ServerDestination to communicate the ORB move request.

At step 103, ServerDestination 30 creates the ServerContext 32 and, for each URL provided by ServerSource 20, creates a server connection 37 with a new URL. This results in the state depicted in FIG. 2 in which ServerDestination 30 now has the structure into which the ORB 34 and Application objects can be moved and in which ServerSource 20 is ready to suspend request processing and move the ORB.

At step 104, ServerSource 20 tells the RequestHandlers 26 to suspend processing of new requests. In suspending request processing, the ServerSource RequestHandlers allow new connections to be created, but add new client requests to a hold queue.

At step 105, when all currently executing requests are completed, the ServerContext 22 moves the ORB 24 and all the services, for example those provided by Application Object 29a, exported by the ORB to the new ServerContext 32 in the ServerDestination 30. Thus the ORB 34 of ServerDestination 30 includes Reference 38 and Application Object 39 that correspond to the references and application objects of the ServerSource 20.

At step 106, after successfully receiving the ORB 34 and referenced services 39, the ServerContext 32 of ServerDestination 30 begins processing requests.

At step 107, ServerDestination 30 tells ServerSource of the successful transfer of the ServerContext's ORB and referenced services and provides the new URLs, in response to which the ServerContext 22 of ServerSource 20 tells the Request Handler 26 to respond to each sender of a held or queued request with a notification of the new URL(s) on ServerDestination 30 (step 108).

Figure 3:
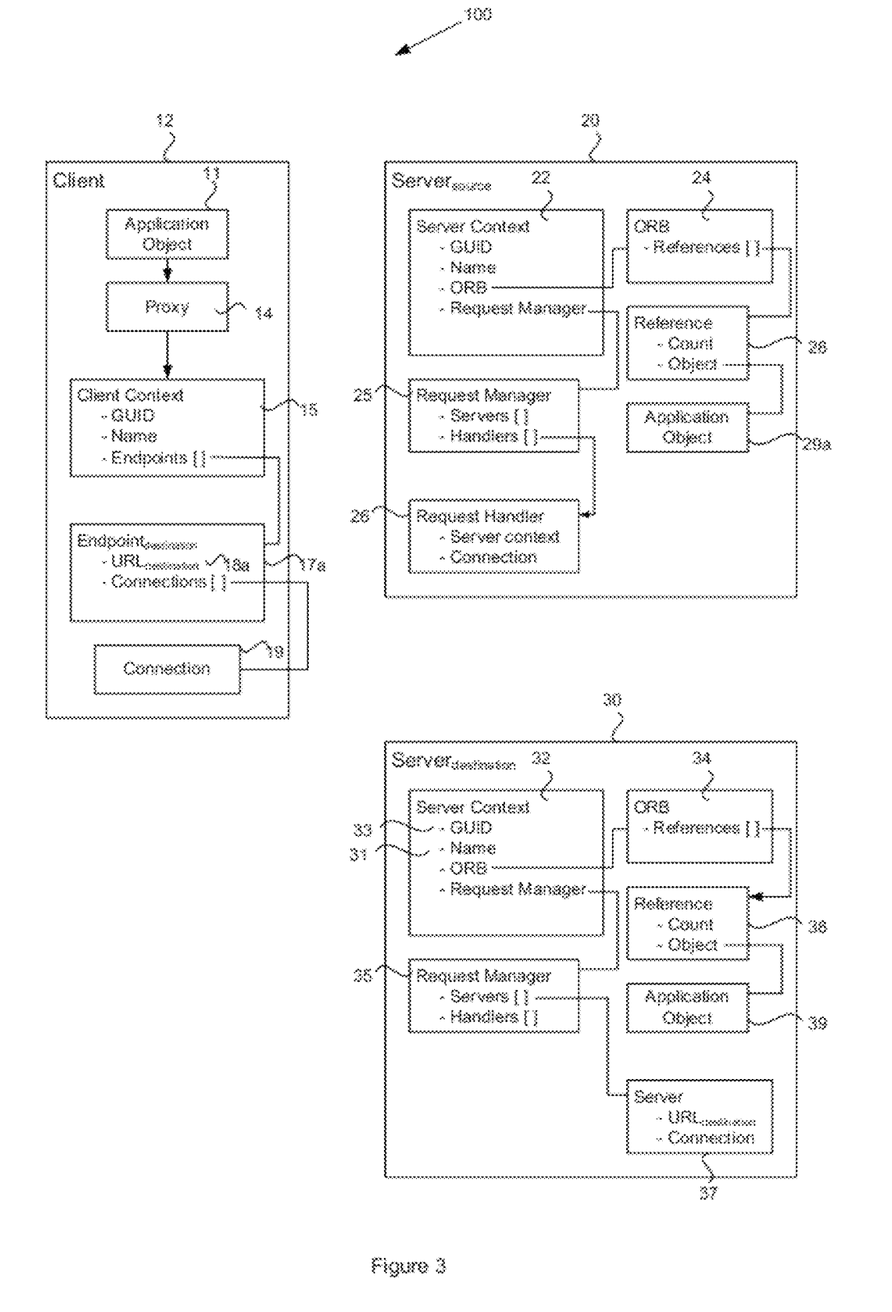
FIG. 3 shows the client, server source and server destination at a second intermediate state.

At step 109, when the Endpoints 17 of ClientContext 15 receive the notification with the new URL, the old connection is discarded, resulting in the state shown in FIG. 3 in which the connection 29b has been closed and discarded, but no new connection to ServerDestination 30 has yet been created. Now in Client 12, the new URL 18a replaces the old one, and a new connection is created using the new URL. The new URL references ServerDestination 30. The original, unmodified request is then resent over the new connection 29b. Sending an "unmodified" request means the client needs to cache requests until receiving a response to prevent changes in the client state from resulting in different values being marshaled and sent as part of the new request.

Figure 4:
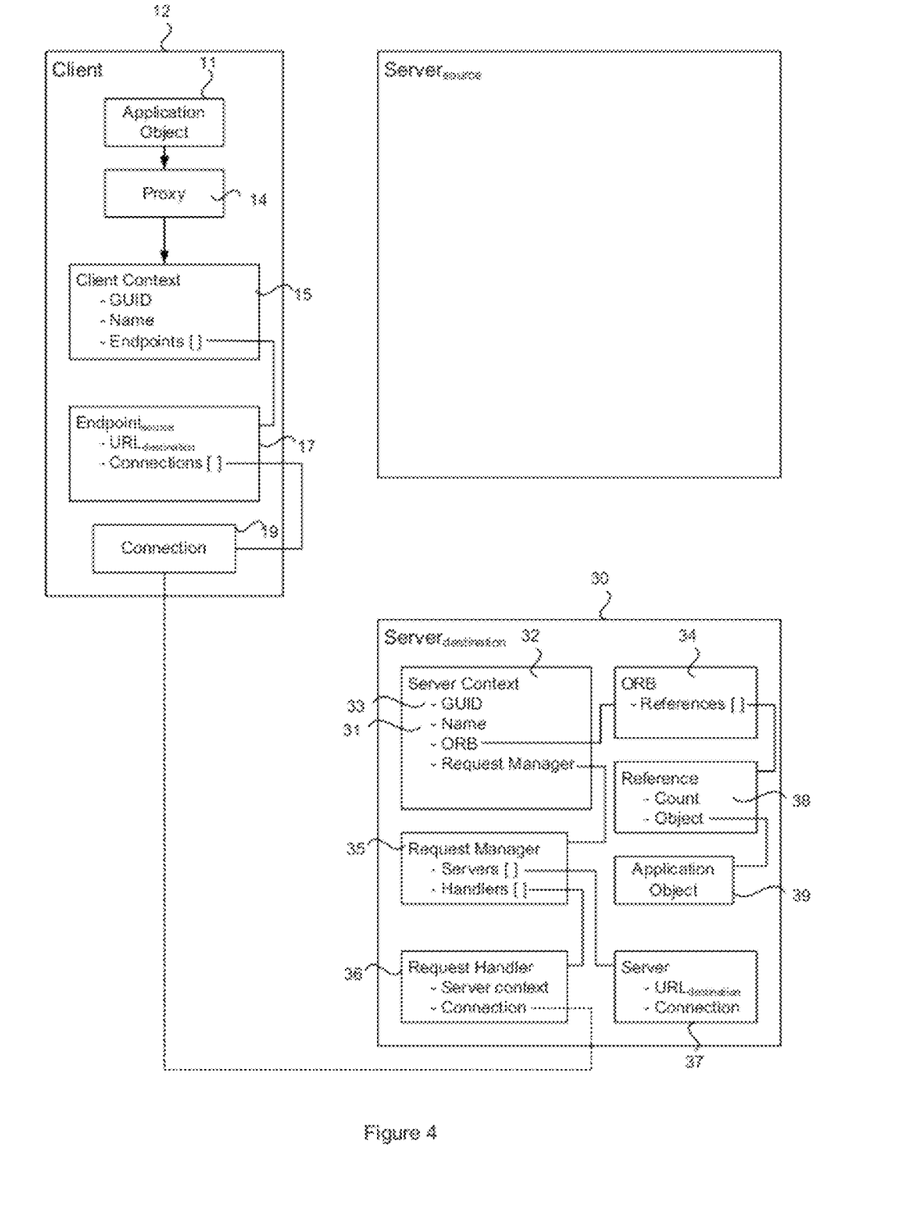
FIG. 4 shows the client, server source and server destination at a final state.
Figure 5:
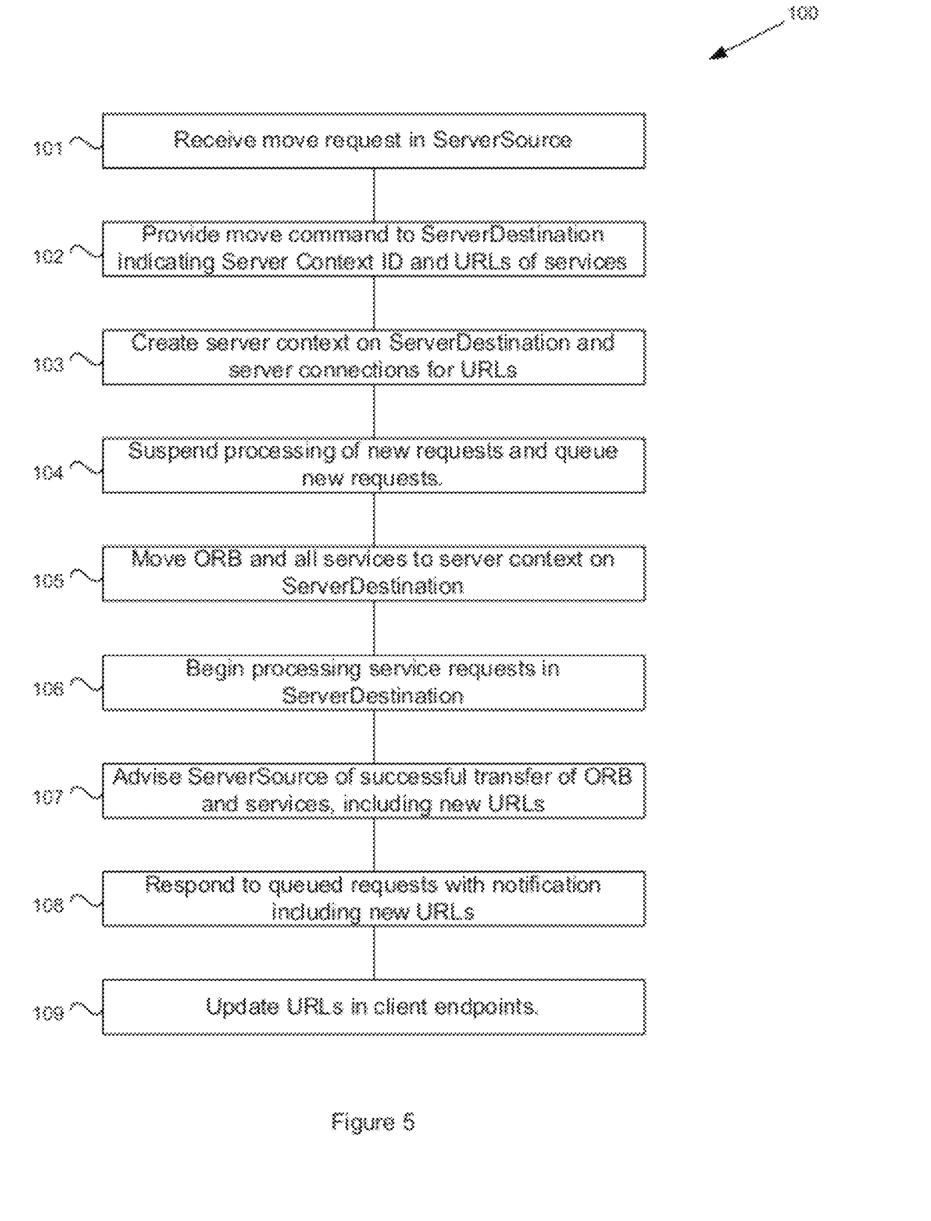
FIG. 5 depicts a process for moving an ORB from the server source to the server destination.

After the RequestHandlers 26 of the ServerContext 22 of ServerSource 20 finish sending the change notifications, ServerSource 20 destroys the ServerContext 22 and all the services it owns, thus resulting in the state shown in FIG. 4, at which time, the move is complete.

An advantage of the above described systems and methods is the use of the ServerContext identity (name and GUID) to maintain the logical relationship between the Proxy/ClientContext and the ServerContext/ORB while changing the identity of the Voyager instance containing the ServerContext/ORB. This contrasts with other known Java RPC implementations provided by Java which lack an identity of the service that is independent of the service's network address, i.e., the logical and physical addresses are bundled into a single identity implemented as a network address (IP address+port number+service index). In the present case, a service's address is ServerContext GUID+service index, which omits the network address, and the ClientContext is responsible for routing a service invocation over a network connection that ends up at the correct ServerContext in the correct Voyager instance.

The above described systems and methods thus provide a mechanism for allowing services to transparently (from the perspective of the client) be moved from one location (network endpoint) to another. This gives distributed applications high reliability and availability through a mechanism to provide failover and load balancing; and provides for easier server maintenance activities.

Continuous operation of critical services is provided by enabling 100% service uptime through transparent service mobility and prevention of loss of requests, which results in improved opportunities for load balancing through transparent service mobility. Application development can also be simplified by supporting ORB and service mobility without coding in the application.

In the above described methods, the identity of the ORB, expressed as a globally unique id (GUID) of the server context, is independent of the ORB's network address, and host operating system identity. This enables the lifetime of a physical connection, e.g., a network socket connection, to be independent of the lifetime of the logical connection.

Instead of shutting down an entire machine or application, individual services are suspended and restarted on the new location after any currently executing requests have been completed. This helps ensure continuity and availability of services, by (1) allowing service state to be persisted, and (2) ensuring that no requests are abnormally terminated.

The components of the system 10 may be embodied in hardware, software, firmware or a combination of hardware, software and/or firmware. In a hardware embodiment, the client, the source server and the destination server may each comprise a processor. The respective client and server applications may be stored as a set of executable instructions in a memory that is operatively associated with the respective processor.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for moving an object request broker comprising at least one registered service from a source server to a destination server, the method comprising:
communicating a URL of each service registered with the source server to the destination server;
creating a server connection in the destination server for the URL of each service from the source server;
suspending processing of new service requests for the at least one registered service in the source server;
queuing service requests received by the source server from one or more clients after the suspension of service request processing;
establishing a destination object request broker in a destination server;
while processing of new service requests to the source server are suspended, communicating the at least one service from the source server to the destination object request broker;

while processing of new service requests to the source server are suspended, registering the at least one service in the destination object request broker; and responding to the queued service requests from the source server to the one or more clients with an identity of the destination object request broker.

2. The method of claim 1 wherein establishing a destination object request broker comprises establishing a destination server context at the destination server, the destination server context comprising the destination object request broker and a server context identity that is the same as a server context identity of a source server context.

3. The method of claim 2 wherein the server context identity is independent of a network address of the source server.

4. The method of claim 1 comprising communicating a URL of the at least one service registered with the destination object request broker to the source server.

5. The method of claim 4 wherein responding to the queued service requests comprises communicating a URL for a requested service received from the destination server context by the source server to the client.

6. The method of claim 5 comprising:
receiving a response to a queued request in a client; and
updating an endpoint in the client with a URL indicated in the response.

7. The method of claim 6 comprising:
creating a new connection at the client to the destination server using the URL indicated in the response;
retrieving a cached service request in the client;
resending the cached service request using the new connection.

8. The method of claim 1 comprising deconstructing a source server context after responding to the plurality of queued service requests.

9. A non-transitory computer readable medium comprising instructions that when read by a processor, cause the processor to perform:
communicating a URL of each service registered with the source server to the destination server;
creating a server connection in the destination server for the URL of each service from the source server;
suspending processing of new service requests for the at least one registered service in the source server;
queuing service requests received by the source server from one or more clients after the suspension of service request processing;
establishing a destination object request broker in a destination server;
while processing of new service requests to the source server are suspended, communicating the at least one service from the source server to the destination object request broker;
while processing of new service requests to the source server are suspended, registering the at least one service in the destination object request broker; and
responding to the queued service requests from the source server to the one or more clients with an identity of the destination object request broker.

10. The non-transitory computer readable medium of claim 9, wherein establishing a destination object request broker comprises establishing a destination server context at the destination server, the destination server context comprising the destination object request broker and a server context identity that is the same as a server context identity of a source server context.

11. A system comprising:
at least one processor; and
at least one memory;
wherein the at least one processor and the at least one memory are communicably coupled to one another;
wherein the at least one processor is configured to:
communicate a URL of each service registered with a source server to a destination server;
create a server connection in the destination server for the URL of each service from the source server;
suspend new service requests for the at least one registered service in the source server;
queue service requests received by the source server from one or more clients after the suspension of service requests;
establish a destination object request broker in a destination server;
while new service requests to the source server are suspended, communicate the at least one service from the source server to the destination object request broker;
while new service requests to the source server are suspended, register the at least one service in the destination object request broker; and
respond to the queued service requests from the source server to the one or more clients with an identity of the destination object request broker.

12. The system of claim 11, wherein an establishment of the destination object request broker comprises an establishment of a destination server context at the destination server, the destination server context comprising the destination object request broker and a server context identity that is the same as a server context identity of a source server context.

13. The system of claim 12 wherein the server context identity is independent of a network address of the source server.

14. The system of claim 11 wherein the at least one processor is configured to communicate a URL of the at least one service registered with the destination object request broker to the source server.

15. The system of claim 14 wherein the response to the queued service requests comprises a communication of a URL for a requested service received from the destination server context by the source server to the one or more clients.

16. The system of claim 15 wherein the at least one processor is configured to receive a response to a queued request in the one or more clients; and
update an endpoint in the one or more clients with a URL indicated in the response.

17. The system of claim 16 wherein the one or more processors are configured to:
create a new connection at the client to the destination server using the URL indicated in the response;
retrieve a cached service request in the client; and
resend the cached service request using the new connection.

18. The system of claim 11 wherein the one or more processors are configured to deconstruct a source server context after the response to the plurality of queued service requests.

* * * * *